July 3, 1962  R. L. CLARKE ET AL  3,041,846
COLD WATER MEANS

Filed April 4, 1960  2 Sheets-Sheet 1

INVENTORS
R. L. Clarke
R. T. Mullins
BY
John H. Widdowson
Attorney

July 3, 1962    R. L. CLARKE ET AL    3,041,846
COLD WATER MEANS

Filed April 4, 1960    2 Sheets-Sheet 2

INVENTORS
R. L. Clarke
R. T. Mullins
BY
Attorney

United States Patent Office 3,041,846
Patented July 3, 1962

3,041,846
COLD WATER MEANS
Robert L. Clarke, Decatur, Ill. (21 Autumn Court, Colonia, N.Y.), and Ralph T. Mullins, 613 S. Eaton, Albion, Mich.
Filed Apr. 4, 1960, Ser. No. 19,811
3 Claims. (Cl. 62—177)

This invention relates to means for cooling water, and in particular to a small, compact self-contained cooling unit which is sized and designed to be mounted beneath the kitchen cabinet in a home to supply cold water to an existing or an additional faucet in the kitchen.

Many refrigeration systems have been designed and developed in recent years designed specifically to cool water or other fluids. The prior art has all been directed to large commercial applications, such as for use in offices, restaurants, hotels, and the like. Throughout this development there has been no compact structure designed or developed especially for or even suitable for use within the home. The only source of cold water in the home is through a bottle or the like retained in the refrigerator. The continual use of this cold water during the hot period of the year prevents any real cooling of the water before its use, and in larger families or where there are children present the continual opening and closing of the refrigerator overburdens the cooling unit in that device.

In accordance with the present invention a cold water unit has been designed specifically for home use. This unit is one which is small and compact enough to be mounted beneath the kitchen cabinet or sink to supply cold water to the faucet presently available or to an additional faucet at the kitchen sink. This is provided, in the preferred manner, by a two section housing, one section being filled with a cooling tank, and the other with a compact compressor unit and associated refrigerant structure to cool water in the tank.

Accordingly it is an object of this invention to provide a new water cooling means.

A further object of the invention is to provide a new water cooling means sized and designed specifically for home use.

Another object of the invention is to provide a cold water device designed and constructed to be sufficiently small and compact to be mounted beneath the kitchen sink to provide cold water thereto.

A still further object of the invention is to provide a cold water device for home use which affords a continuous supply of cold water.

A still further object of the invention is to provide a new water cooling device small enough for home use wherein the cooling coils surround and are secured to the water reservoir and through which the refrigerant is pumped by an adjacent compressor unit.

Various other objects, advantages and features of the invention will become apparent from the following description taken in connection with the accompanying drawings, in which.

Figure 1:
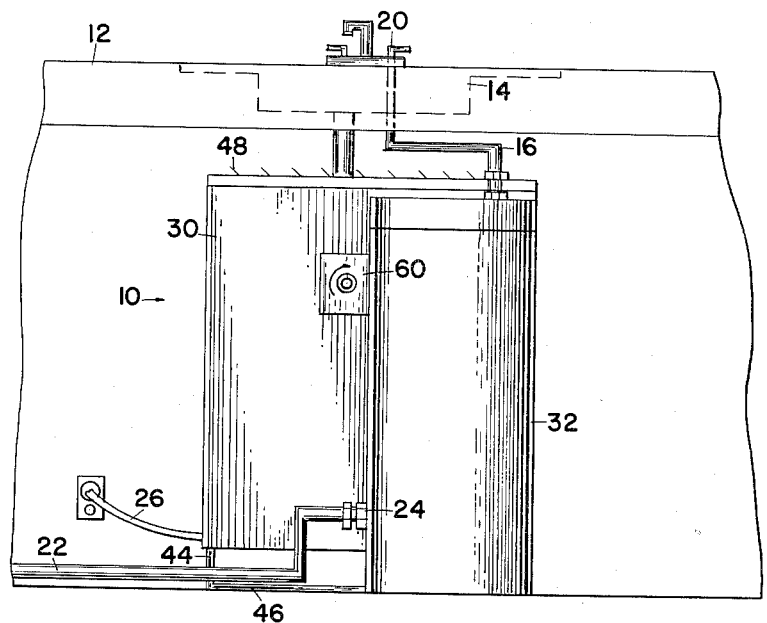
FIG. 1 is a side elevation of the cold water means of the invention mounted in the cabinet beneath the kitchen sink.
Figure 2:
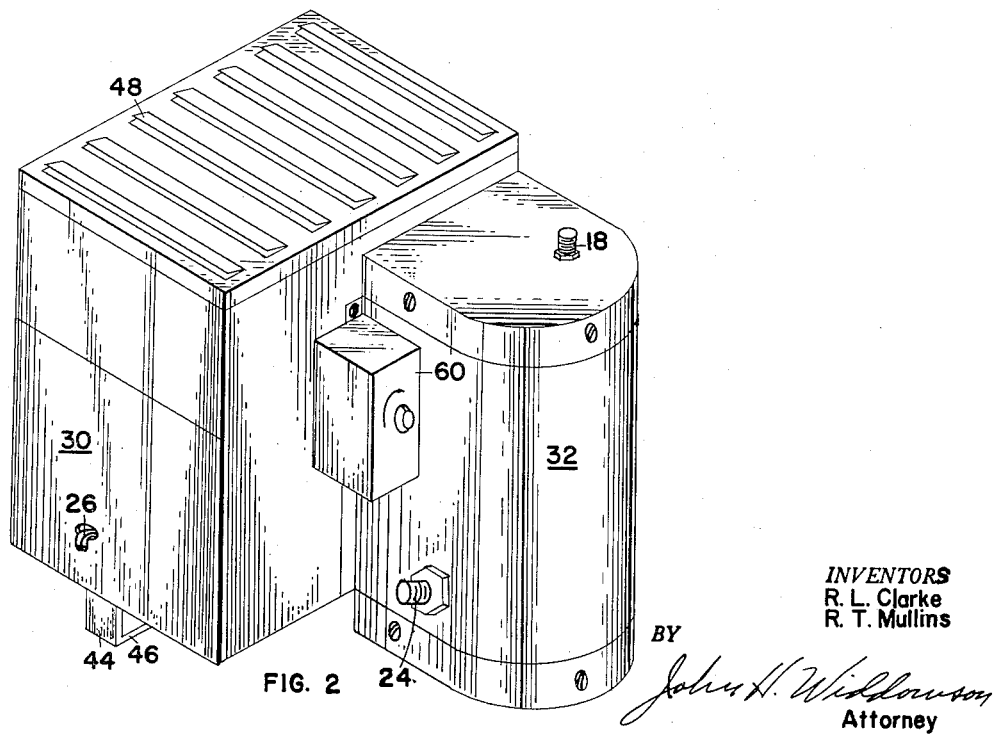
FIG. 2 is an iso-metric view of the preferred construction of the cold water means of the invention.
Figure 3:
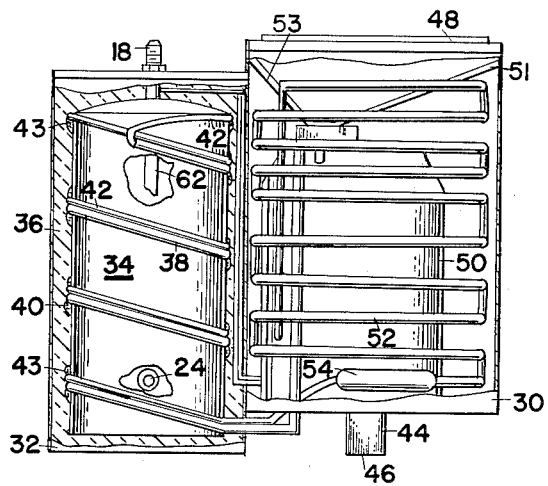
FIG. 3 is a side elevation view, partly in cross section, with the housing broken away to show the interior of the cold water means.

The following is a discussion and description of a preferred specific embodiment of the new cold water means of the invention, such being made with reference to the drawings whereon the same reference numerals are used to indicate the same or similar parts and/or structure. It is to be understood that such discussion and description is not to unduly limit the scope of the invention.

Referring now to the drawings in detail, FIG. 1 shows the cold water means of the invention mounted in its preferred environment. The cold water device, shown generally at 10, is mounted beneath the kitchen cabinet 12, preferably directly beneath the sink 14. The device can, of course, be mounted elsewhere and piped to the faucet. A pipe 16 connects the outlet 18 of the cold water means to a faucet 20 in the sink 14. Another pipe 22 connects the inlet 24 of the cold water means to a supply of tap water in the house. An electric cord 26 leads from the motor driving the compressor in the unit to a suitable electric outlet.

The cold water means of the invention can be divided into two, small basic units, a cooling cabinet 30 housing the refrigerating system of the unit, and a housing 32 for the cold water tank of the system. The housing 32 is shown as secured to the side of the cooling cabinet 30, however it is to be understood that this unit can be mounted on the end or another side of the cabinet without departing from this disclosure.

The housing 32 is preferably semi-cylindrical in shape in its projecting end and has mounted in it, in any suitable manner, an elongated cold water tank 34. It has been found desirable to have the water storage tank 34 of a two to four quart capacity, however other sizes can, of course, be used. The tank 34 has an inlet 24 connected to a source of tap water, and an outlet connection 18 from which the cold water is removed from the tank. The tank 34 is shown as an elongated cylinder, however other shapes can be used. Insulation material 36, which can be on the order of one inch thick, surrounds the cold water tank 34 and preferably fills the space between the tank 34 and the housing 32.

Water in the tank 34 is cooled by a spirally wound refrigerant cooling coil 38 which surrounds and is secured to the tank 34 by suitable means, such as welds 40. The inlet of the cooling coil 38, at its upper end, receives the outlet end of a capillary tube 42, which in turn spirals around the tank 34 adjacent to the cooling coil 38 and is also secured to the tank by suitable means, such as welds 43. Of course, other expansion means, such as a float valve can be used, if desired.

The hollow cooling cabinet 30 has a foot 44 secured thereto with the sole 46 thereof in the same plane as the plane of the bottom of the housing 32. The top of the housing 30 is louvered as shown at 48. The purpose of the foot 44 and louvers 48 will be explained more fully hereinafter.

A common compressor unit 50 is centrally mounted in the cooling cabinet 30 and in any suitable manner, such as by the braces 51 and 53. The usual condenser coils 52 extend around the walls of the cooling cabinet. The condenser coils 52 are shown as being on three sides of the cabinet, which aids in reducing the size of the unit and making it compact enough for mounting in a kitchen cabinet. This can be modified or changed as desired without departing from this disclosure in applications where the space is available. One end of the condenser coil 52 is connected to the compressor discharge and the other end is secured to a drying chamber 54 at the inlet thereof. The capillary tube 42 and the cooling coils 38 extend through the cooling cabinet 30 and the capillary tube 42 is secured to the dryer 54 outlet and the cooling coils 38 outlet to the compressor 50 inlet in the usual manner.

The cabinet 30 is open at the bottom and louvered at 48 at the top so that cooling air for the condenser coils 52 can enter from the open bottom of the cabinet and pass out through the louvered top thereof. The foot 44 is provided as hereinbefore described so that cool air will have ready access to the interior of the cooling cabinet 30. Since no fan is used with the cooling unit, the openings for supplying cooling air to the coils 52 become increasingly important. The open, and elevated bottom, and louvered top of cabinet 30 as described have been found most desirable to provide the necessary cooling function.

A thermostat 60 of the usual construction is secured to the outside of one or both of the cabinets as shown. A connection from the thermostat 60 leads to the interior of the water tank as shown at 62 and the temperature thereby measured operates the motor driving the compressor 50 in the usual and well known manner.

The refrigerating system of the device as hereinbefore described is of a usual construction, the parts of which are available on the open market. Various sizes of compressor units can be used, of course, but it has been found that a unit having a rating of from 1/20 to 1/3 of a horsepower, 115 volts, 50 to 60 cycles has been found desirable for most applications.

Figure 4:
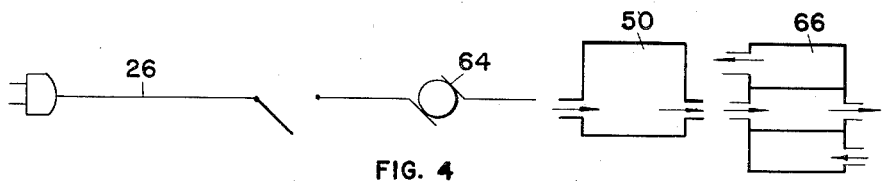
FIG. 4 is a schematic view showing the operation of the cooling device.

The schematic diagram shown in FIG. 4 illustrates the principle on which the device operates. Electric current from a suitable source is supplied through line 26 to the motor 64 which operates the compressor unit 50, which in turn supplies cooling fluid for the heat exchanging function shown at 66.

As will be apparent from the foregoing description, a new, small and compact cold water device has been provided which is particularly adapted for home use. The device is constructed and arranged into a compact unit so that it can be conveniently mounted beneath a kitchen cabinet to directly supply cold water to a faucet at the sink thereof. This device provides a unit which has long been needed, but which has been neglected in the rush to supply large commercial type units for restaurants, hotels, and the like.

While the invention has been described in connection with a preferred specific embodiment thereof, it will be understood that this description is intended to illustrate and not limit the scope of the invention, which is defined by the claims.

It will be evident to those skilled in the art that various modifications of this invention can be made, or followed, in the light of this description and discussion, without departing from the spirit of the disclosure or the scope of the claims.

We claim:

1. A small, compact and cabinet mountable water cooler of the type described comprising, in combination, an elongated cold water tank, an inlet conduit through the side of said tank, an outlet conduit on the top of said tank, a semi-cylindrical housing for said cold water tank, said housing closed to the passage of air therethrough, insulation material separating said housing from said cold water tank, a cooling coil spirally wound around said tank, a capillary tube spirally wound around said tank adjacent to said cooling coil, said capillary tube connected to one end of said cooling coil near the top of said tank, a separate and hollow cooling cabinet secured to the housing for said water tank, said cabinet separated from said housing to the passage of air, a foot secured to said cooling cabinet with the sole thereof in the same plane as the plane of the bottom of said housing for said cold water tank, a compressor unit centrally mounted in said cooling cabinet, condenser coils from said compressor extending around three of the inside walls of said cooling cabinet, said cooling cabinet being louvered at the top and open at the bottom thereof to facilitate the flow of cooling air over said condenser coils and through said cooling cabinet only, said foot elevating said cooling cabinet to provide a lower cooling air inlet, said cooling coils and said capillary tube passing through said housing for said cold water tank and said cooling cabinet and connected to the intake of said compressor and the outlet of said condenser coils, respectively, and a thermostat secured to the outside of said cooling cabinet and connected to and regulating the temperature of the water at the outlet of said cold water tank, said water cooler being of size, constructed and adapted for mounting in a kitchen cabinet and so that tap water is supplied to said cold water tank through said water inlet whereupon it is cooled therein by refrigerant passing through said cooling coils and said cooled water can be removed from said tank through said water outlet, and cooling air for said condenser coils will pass through said cooling cabinet only.

2. A small, compact and cabinet mountable water cooler comprising, in combination, a water tank having an inlet and an outlet, said inlet being connectable to a source of water and said outlet being connectable to a cold water tap on a sink or the like, a housing for said water tank, said housing being closed to the passage of air therethrough, insulation material separating said housing from said water tank, a cooling coil spirally wound around said tank, a capillary tube spirally wound around said tank and having one end thereof connected to one end of said cooling coil, a separate and hollow cooling cabinet open at the top and bottom to substantially unrestricted passage of air and secured to said housing for said water tank in side by side relation, an imperforate wall between said cabinet and said housing separating them to the passage of air, narrow and elongated rest means mounted on the sides at the bottom of said cabinet and projecting therefrom to provide substantially unrestricted air passageways from the atmosphere into said cabinet when same is mounted in upright position on a horizontal surface, a compressor unit mounted in said cooling cabinet, condenser coils from said compressor extending around the inside walls of said cooling cabinet, said cooling coils and said capillary tube passing through said housing for said water tank and said cooling cabinet and connected in the other end portions to the intake of said compressor and to the outlet of said condenser coil, respectively, said water cooler being of size and constructed and adapted for mounting in a kitchen cabinet or the like to be connected to tap water means for supplying water to the cold water tank through the water inlet thereof to be cooled therein by refrigerant passing through said cooling coils and said cooled water can be removed from said tank through said water outlet, and cooling air for said condenser coils will pass through said cooling cabinet only.

3. A water cooling unit comprising, in combination, a water tank having an inlet and an outlet, said inlet being connectable to a source of water and said outlet being connectable to a water tap on a sink or the like, a closed housing for said tank constructed to prevent the passage of air therethrough, a cooling coil around said tank to receive refrigerant, means with said cooling coil to deliver refrigerant thereinto for expansion during operation, a separate cooling cabinet attached to said housing, imperforate wall means between said cabinet and said housing separating same to the passage of air, said cabinet being open at the top and bottom to substantially unrestricted flow of air therethrough, rest means with the lower end portion of said cabinet and projecting therefrom to provide a substantially unrestricted air passageway from the atmosphere into said cabinet when same is mounted in upright position on a horizontal surface, refrigerating means mounted in said cooling cabinet and connected to said cooling coil and constructed to compress a refrigerant received from said cooling coil and supply same to said cooling coil through said means to deliver refrigerant thereinto, said water cooling unit being constructed and adapted and of size for mounting in a kitchen cabinet or the like so that water supplied to said water tank is cooled therein and supplied to said water outlet.

References Cited in the file of this patent

UNITED STATES PATENTS

| | | |
|---|---|---|
| 1,750,893 | King | Mar. 18, 1930 |
| 1,926,341 | Lipman | Sept. 12, 1933 |
| 2,339,229 | Wyllie | Jan. 11, 1944 |
| 2,509,294 | Fruen | May 30, 1950 |
| 2,614,401 | Roberts | Oct. 21, 1952 |
| 2,850,884 | Jacobs | Sept. 9, 1958 |